(12) United States Patent
Marsden et al.

(10) Patent No.: US 8,038,209 B2
(45) Date of Patent: Oct. 18, 2011

(54) ENERGY-DISSIPATION SYSTEM

(75) Inventors: Andrew W Marsden, Hingham, MA (US); Ward Fritz, Chelsea, MA (US); Walter S Bezaniuk, Berkley, MA (US); Joe Langley, Foxboro, MA (US); David Amirault, Easton, MA (US)

(73) Assignee: Cosco Management, Inc., Wilmington, DE (US)

( * ) Notice: Subject to any disclaimer, the term of this patent is extended or adjusted under 35 U.S.C. 154(b) by 151 days.

(21) Appl. No.: 12/469,589

(22) Filed: May 20, 2009

(65) Prior Publication Data

US 2010/0295347 A1    Nov. 25, 2010

(51) Int. Cl.
*B60N 2/42*      (2006.01)
(52) U.S. Cl. .................. 297/216.11; 297/216.1
(58) Field of Classification Search .............. 297/216.1, 297/216.11; 280/739, 729, 728.1, 730.1; 180/271, 274
See application file for complete search history.

(56) References Cited

U.S. PATENT DOCUMENTS

| | | | |
|---|---|---|---|
| 4,213,202 A * | 7/1980 | Larry ................................ 2/456 |
| 4,534,068 A * | 8/1985 | Mitchell et al. .................... 2/414 |
| 4,642,814 A * | 2/1987 | Godfrey ............................ 2/462 |
| 4,883,299 A * | 11/1989 | Bonar ............................ 293/110 |
| 4,899,961 A | 2/1990 | Herndon |
| 4,919,483 A | 4/1990 | Horkey |
| 5,235,715 A | 8/1993 | Donzis |
| 5,292,175 A | 3/1994 | Artz |
| 5,292,176 A | 3/1994 | Artz |
| 5,335,968 A | 8/1994 | Sheridan et al. |
| 5,567,015 A | 10/1996 | Arias |
| 5,881,395 A | 3/1999 | Donzis |
| 6,485,101 B2 | 11/2002 | Kassai et al. |
| 6,519,780 B2 | 2/2003 | Goodwin |
| 7,125,073 B2 | 10/2006 | Yoshida |
| 7,232,182 B2 | 6/2007 | Yoshida |
| 7,234,771 B2 | 6/2007 | Nakhla |
| 7,246,853 B2 | 7/2007 | Harcourt et al. |
| 7,293,828 B2 * | 11/2007 | Yoshida ................... 297/216.11 |
| 7,654,613 B2 | 2/2010 | Bass |
| 7,717,506 B2 | 5/2010 | Amesar et al. |
| 7,726,734 B2 | 6/2010 | Mahal et al. |
| 7,744,154 B2 | 6/2010 | Marsden et al. |
| 7,748,781 B2 | 7/2010 | Bass |
| 7,774,866 B2 * | 8/2010 | Ferrara ............................ 2/455 |
| 2001/0043001 A1 | 11/2001 | Kassai et al. |
| 2002/0153753 A1 | 10/2002 | Kassai |
| 2007/0085394 A1 | 4/2007 | Yang |

(Continued)

FOREIGN PATENT DOCUMENTS

EP      0928718      7/1999

(Continued)

OTHER PUBLICATIONS

International Search Report dated Feb. 13, 2009, for International Application No. PCT/US2008/087382.

(Continued)

*Primary Examiner* — Sarah B McPartlin
(74) *Attorney, Agent, or Firm* — Barnes & Thornburg LLP

(57) ABSTRACT

A child restraint includes a juvenile vehicle seat and an energy-absorption apparatus coupled to the juvenile vehicle seat. The energy-absorption apparatus is configured to absorb external energy associated with an external impact force applied to the energy-absorption apparatus.

23 Claims, 6 Drawing Sheets

U.S. PATENT DOCUMENTS

| | | |
|---|---|---|
| 2007/0252418 A1 | 11/2007 | Harcourt et al. |
| 2008/0258518 A1 | 10/2008 | Santamaria |
| 2009/0066125 A1* | 3/2009 | Nett et al. ............... 297/216.11 |
| 2009/0152913 A1 | 6/2009 | Amesar et al. |
| 2009/0179469 A1 | 7/2009 | Bass |
| 2009/0179470 A1 | 7/2009 | Bass |
| 2009/0256404 A1 | 10/2009 | Strong et al. |
| 2010/0019554 A1 | 1/2010 | Mahal et al. |
| 2010/0026064 A1 | 2/2010 | Marsden et al. |
| 2010/0134470 A1 | 6/2010 | Bu et al. |
| 2010/0194158 A1* | 8/2010 | Mahal et al. ............ 297/216.11 |

FOREIGN PATENT DOCUMENTS

| | | |
|---|---|---|
| EP | 1167114 | 1/2002 |
| WO | 2009076514 | 6/2009 |

OTHER PUBLICATIONS

International Preliminary Report on Patentability (Ch. II) issued in connection with PCT/US2008/087382 and completed by the US Examining Authority on Oct. 9, 2010.

European Search Report dated Aug. 31, 2010, for related European Application No. EP 10163494.

* cited by examiner

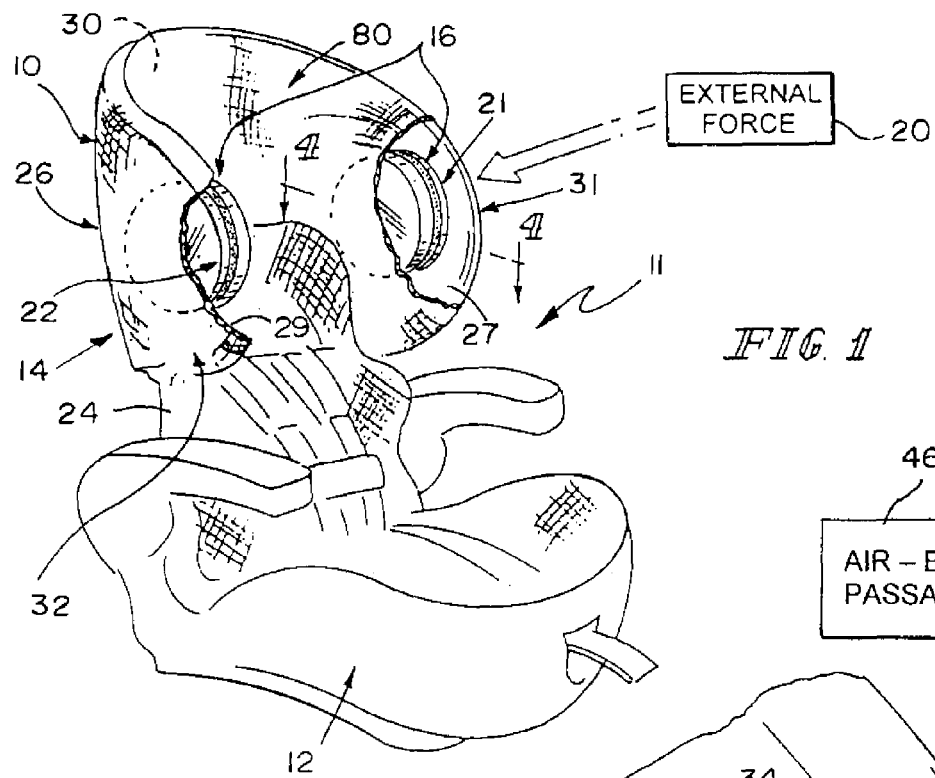
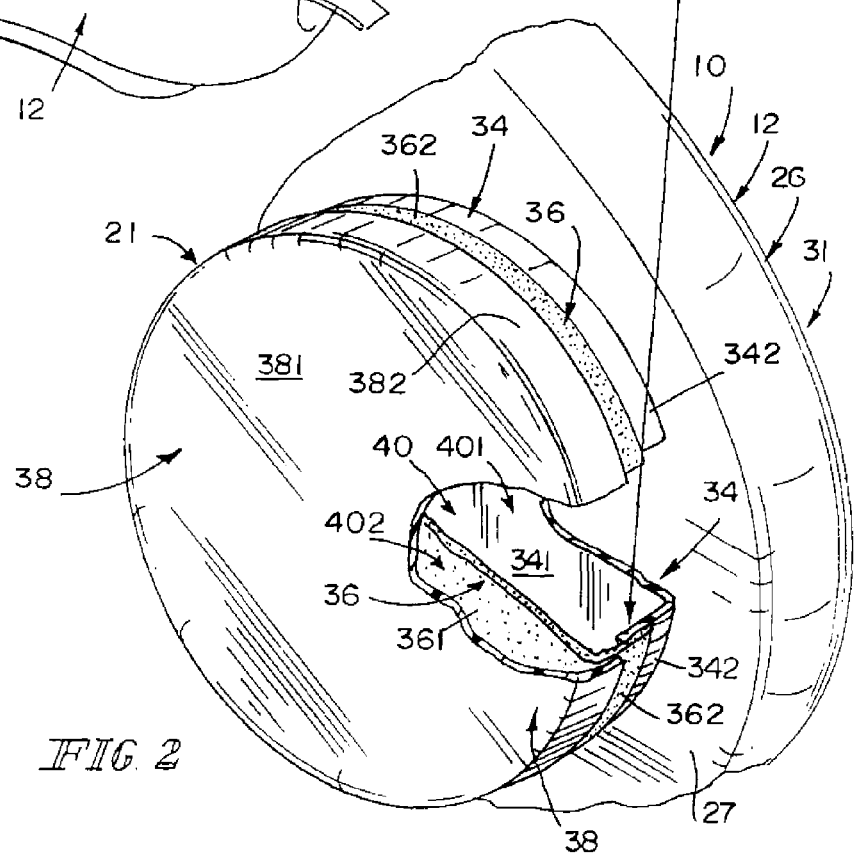
FIG. 1
FIG. 2

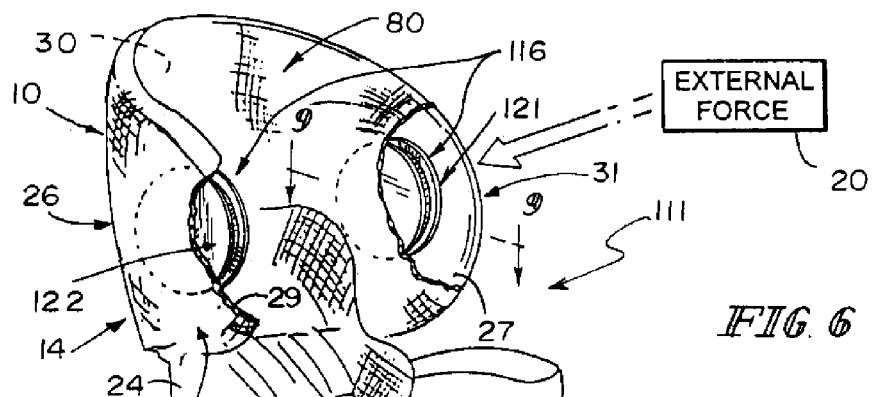
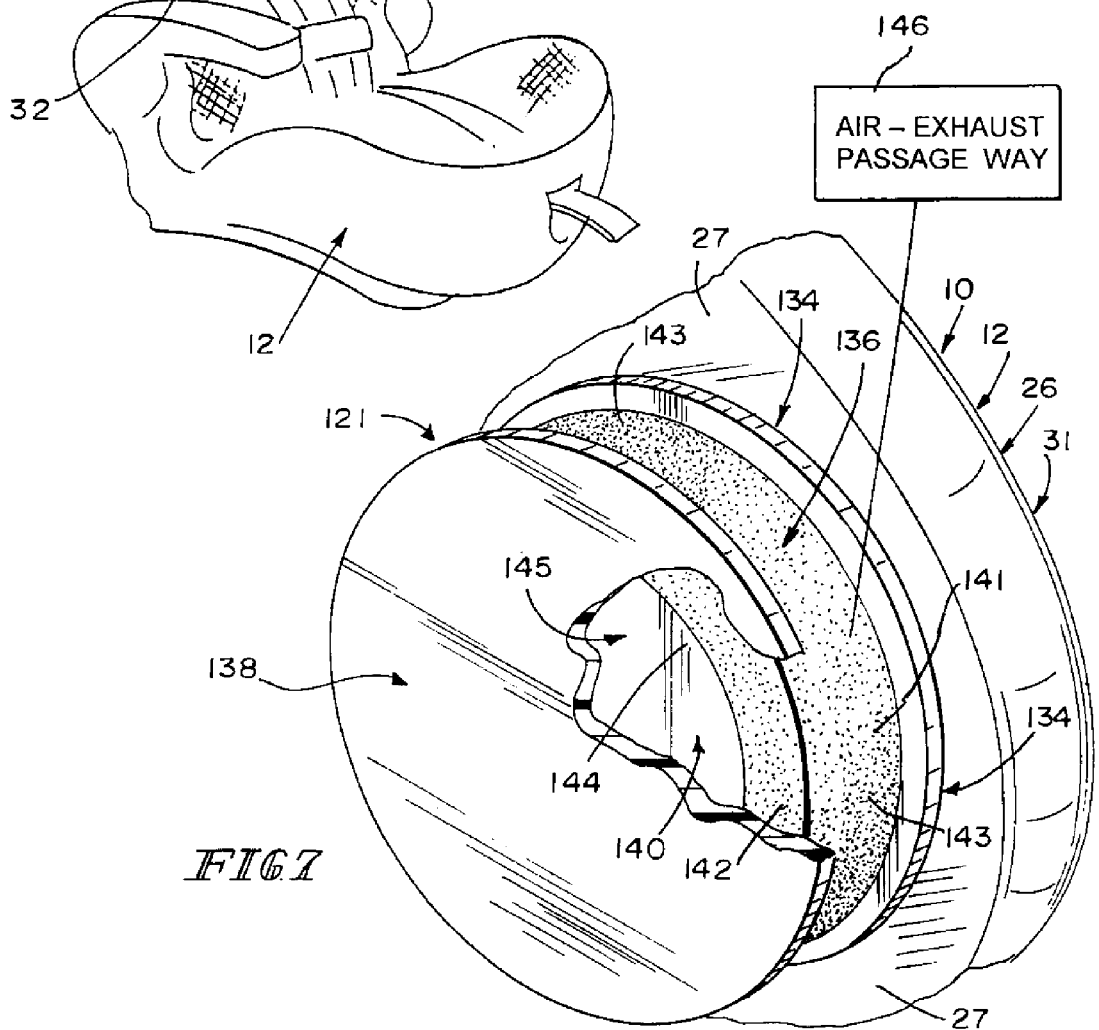

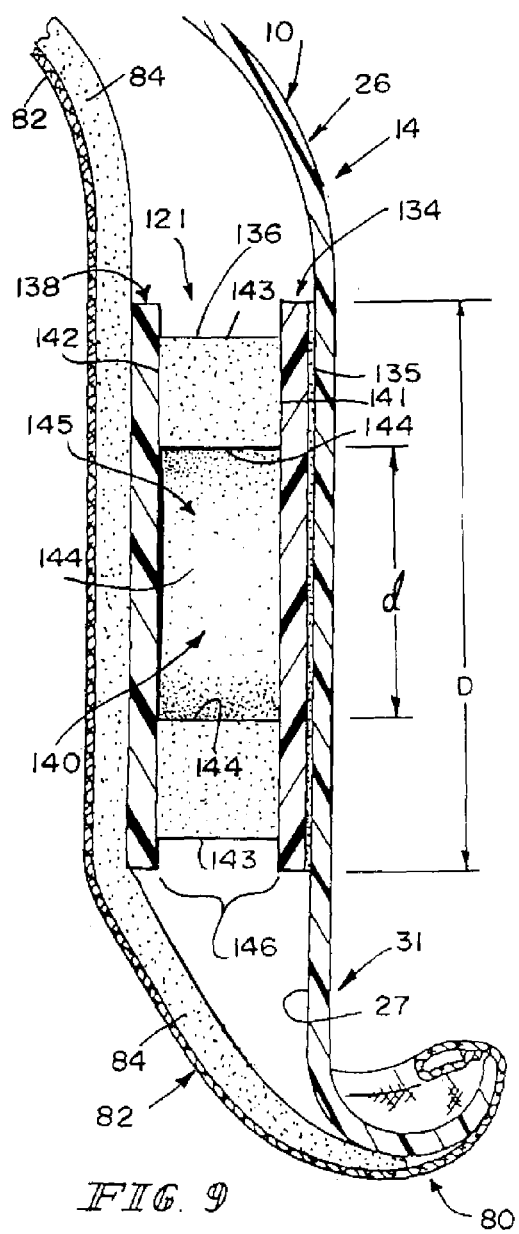
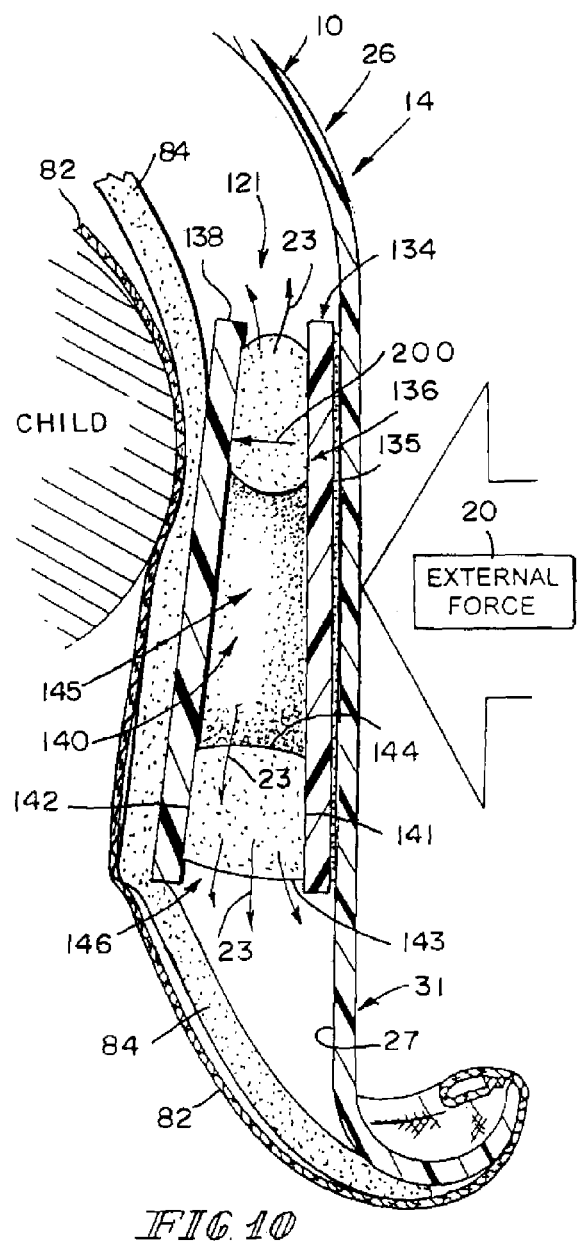

US 8,038,209 B2

ENERGY-DISSIPATION SYSTEM

BACKGROUND

The present disclosure relates to energy-absorbing apparatus, and in particular, to devices for dissipating energy associated with external impact forces. More particularly, the present disclosure relates to an energy-dissipation system included in a juvenile product such as a child-restraint system.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in gs. The g is a non-SI unit equal to the nominal acceleration due to gravity on earth at sea level. A short-term acceleration experienced by a child seated in a juvenile vehicle seat (or any other juvenile seat) that moves suddenly is called a shock and is measured in gs.

SUMMARY

An energy-dissipation system in accordance with the present disclosure is included in an apparatus that is exposed to external impact forces. In an illustrative embodiment, the energy-dissipation system is coupled to a juvenile vehicle seat to provide a child-restraint system.

In one illustrative embodiment, the energy-dissipation system includes a cup-shaped inner shell coupled to the juvenile vehicle seat, a cup-shaped outer shell arranged to cooperate with and move relative to the cup-shaped inner shell to form a variable-volume interior region therebetween, and a support frame in the variable-volume interior region. The support frame includes an endless rim made of an air-permeable material. The endless rim is arranged to lie in an air-exhaust passageway formed between the cup-shaped inner and outer shells. Air extant in the interior region is discharged to the surroundings through the air-permeable endless rim in response to telescoping movement of the cup-shaped outer shell toward the cup-shaped inner shell so as to decrease the volume of the interior region during exposure of the energy-dissipation system to an external impact force.

In another illustrative embodiment, the energy-dissipation system includes a plate-shaped inner shell coupled to the first side-wing panel, a plate-shaped outer shell separated from the plate-shaped inner shell, and a ring-shaped support frame interposed between and mated with the plate-shaped inner and outer shells and made of an air-permeable material. The plate-shaped inner and outer shells cooperate to define means for discharging air extant in an interior region formed in the ring-shaped support frame and between the plate-shaped inner and outer shells to surroundings outside the ring-shaped support frame during movement of the plate-shaped outer shell toward plate-shaped inner shell in response to exposure of the energy-dissipation system to an external impact force so that a ride-down pad comprising the plate-shaped inner and outer shells and the ring-shaped support frame absorbs external energy associated with the external impact force to minimize g-loads experienced by a child seated on the juvenile vehicle seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a child-restraint system including a juvenile vehicle seat having a seat bottom and a seat back extending upwardly from the seat bottom and an energy-dissipation system coupled to the seat back and made in accordance with the present disclosure, with portions broken away, and showing that the seat back comprises a backrest coupled to the seat bottom and a headrest coupled to the backrest and that the energy-dissipation system comprises a right-side ride-down pad mounted on an inner wall of a first side-wing panel included in the headrest and a left-side ride-down pad mounted on an inner wall of an opposite second side-wing panel included in the headrest and showing an external impact force about to strike an outer portion of the first side-wing panel carrying the right-side ride-down pad;

FIG. 2 is an enlarged perspective view of the right-side ride-down pad mounted on the first side wing panel of the headrest shown in FIG. 1, with portions broken away, showing a cup-shaped inner shell coupled to the first side-wing panel and arranged to open away from the panel, a cup-shaped outer shell separated from the inner shell and arranged to open toward the panel, and a cup-shaped support frame interposed between the inner and outer shells and arranged to open toward the panel;

FIG. 6 is a perspective view of a child-restraint system including a juvenile vehicle seat having a seat bottom and a seat back extending upwardly from the seat bottom and an energy-dissipation system coupled to the seat back and made in accordance with another embodiment of the present disclosure, with portions broken away, and showing that the seat back comprises a backrest coupled to the seat bottom and a headrest coupled to the backrest and that the energy-dissipation system comprises a right-side ride-down pad mounted on an inner wall of a first side-wing panel included in the headrest and a left-side ride-down pad mounted on an inner wall of an opposite second side-wing panel included in the headrest and showing an external impact force about to strike an outer portion of the first side-wing panel carrying the right-side ride-down pad;

FIG. 7 is an enlarged perspective view of the right-side ride-down pad mounted on the first side-wing panel of the headrest shown in FIG. 6, with portions broken away, showing a plate-shaped inner shell coupled to the first side-wing panel, a plate-shaped outer shell separated from the inner shell, and a ring-shaped support frame interposed between the inner and outer shells;

FIG. 9 is an enlarged sectional view taken along line 9-9 of FIG. 6 showing placement of the right-side ride-down pad on an inner wall of the first side-wing panel of the headrest; and FIG. 10 is a sectional view similar to FIG. 9 showing movement of the outer shell toward the inner shell following sudden application of an external impact force to the first side-wing panel of the headrest and showing that air is discharged from an air chamber provided between the inner and outer shells through an air-exhaust passageway defined between the inner and outer shells and through a permeable portion of the ring-shaped support frame.

DETAILED DESCRIPTION

Figure 3:
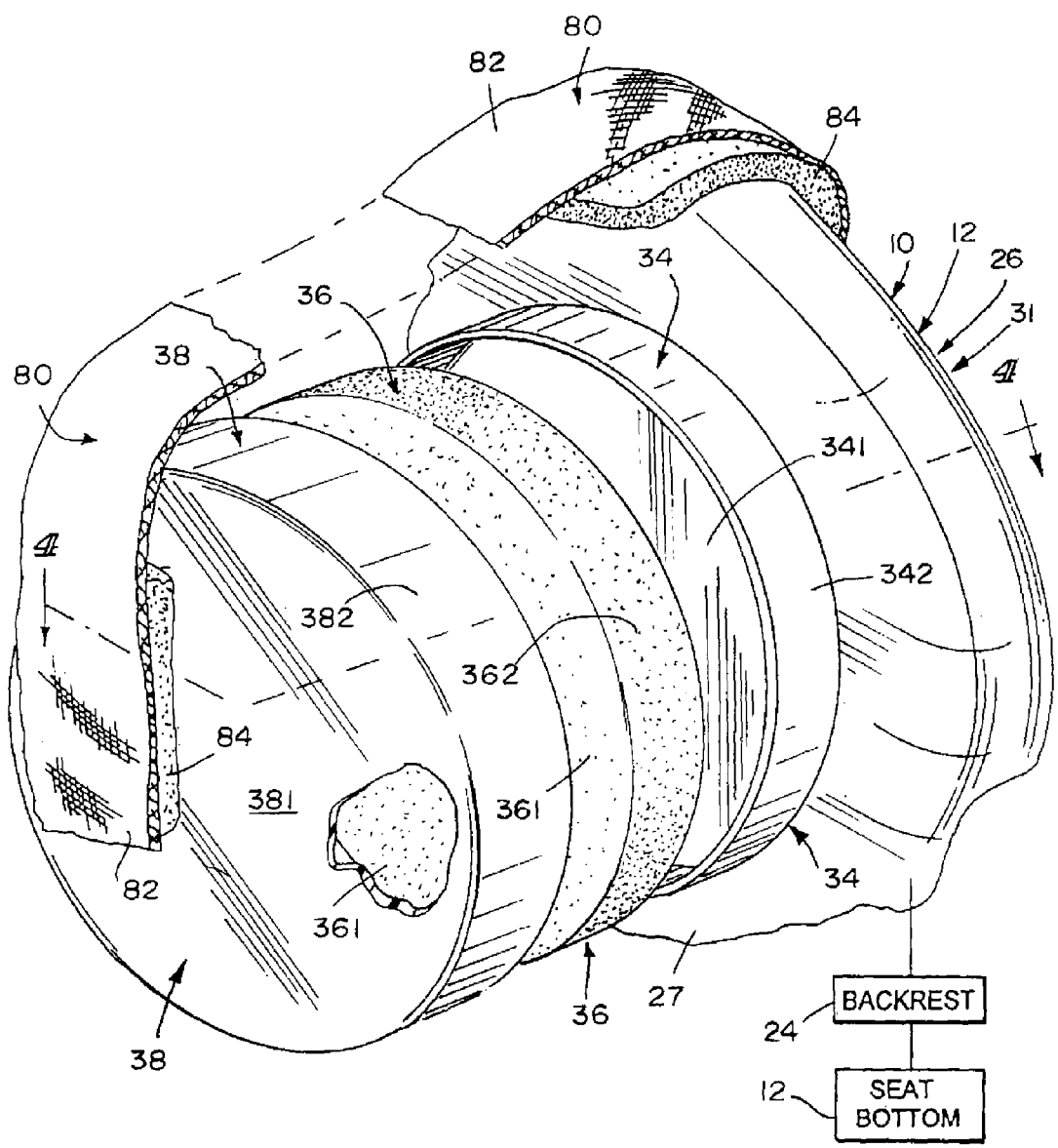
FIG. 3 is an exploded perspective assembly view of the right-side ride-down pad of FIGS. 1 and 2.

An illustrative child-restraint system 11 includes a juvenile vehicle seat 10 and an energy-dissipation system 16 coupled to juvenile vehicle seat 10 as suggested in FIG. 1. In illustrative embodiments, juvenile vehicle seat 10 includes a seat bottom 12 and a seat back 14 extending upwardly from seat bottom 12 and carrying energy-dissipation system 16.

Energy-dissipation system 16 comprises ride-down pads that are designed to minimize the g-loads experienced by a child seated on seat bottom 12 of juvenile vehicle seat 10 during exposure of seat 10 to an external impact force 20. Ride-down pads 21, 22 are shown, for example, in FIG. 1. Right-side ride-down pad 21 is shown in more detail in FIGS. 2-5. Reference is hereby made to U.S. application Ser. No. 12/327,376, filed Dec. 4, 2008, the entirety of which is hereby incorporated by reference herein, for disclosures of various ride-down pad configurations and mounting arrangements. Ride-down pads 121, 122 in accordance with another embodiment of the present disclosure are shown, for example, in FIGS. 6-10 and cooperate to form an energy-dissipation system 116.

As suggested in FIG. 1, seat back 12 of juvenile vehicle seat 10 includes a backrest 24 arranged to extend upwardly from seat bottom 12 and a headrest 26 coupled to backrest 24. Right-side ride-down pad 21 is coupled to an inner wall 27 of a first side-wing panel 31 included in headrest 26 as suggested in FIGS. 1-5. Left-side ride-down pad 22 is coupled to an inner wall 29 of a second side-wing panel 32 included in headrest 26 as shown in FIG. 1. A rear panel 30 is included in headrest 26 and arranged to interconnect first and second side-wing panels 31, 32 as suggested in FIG. 1.

Figure 5:
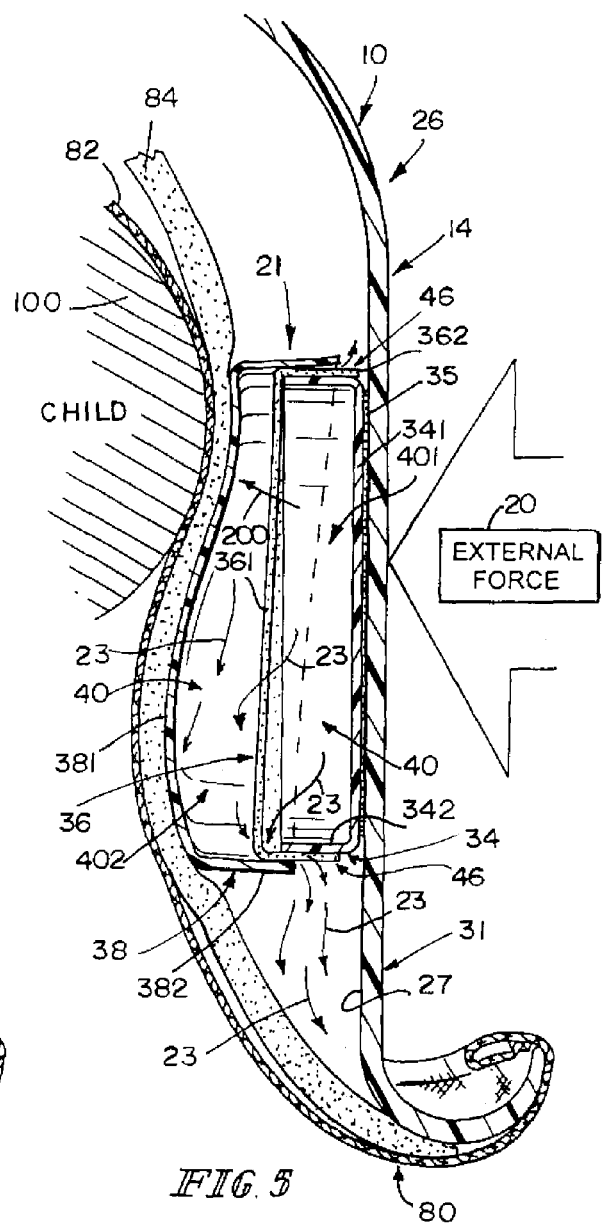
FIG. 5 is a sectional view similar to FIG. 4 showing movement of the outer shell toward the inner shell following sudden application of an external impact force to the first side-wing panel of the headrest and showing that air is discharged from an air chamber provided in the right-side ride-down pad between the inner and outer shells through an air-exhaust passageway defined between the inner and outer shells and through a permeable portion of the cup-shaped support frame located in the air-exhaust passageway.

During a collision or other incident, application of an external impact force 20 to first side-wing panel 31 of headrest 26 causes energy to be transferred from an impacting object (not shown) to right-side ride-down pad 21 as suggested in FIGS. 1 and 5. Ride-down pad 21 discharges air 23 contained therein to the surroundings and absorbs that transferred energy as suggested in FIG. 5. Transferred energy is absorbed to minimize the magnitude of a resulting force applied to a child 100 seated in juvenile vehicle seat 10 by a force transmitter 200 comprising outer cover 80, right-side ride-down pad 21, and first side-wing panel 31 (all included in juvenile vehicle seat 10) during the collision.

Ride-down pad 21 functions to minimize the g-loads (acceleration) experienced by child 100 seated on seat bottom 12 of juvenile vehicle seat 10 during exposure of seat 10 to external impact force 20 as suggested in FIG. 5. Ride-down pad 21 also functions to maximize the time interval (i.e., ride-down time) between the moment the impacting object strikes juvenile vehicle seat to apply the external impact force 20 to ride-down pad 21 and the moment that resulting force reaches zero. Ride-down pad 22 functions in a manner similar to ride-down pad 21.

Figure 4:
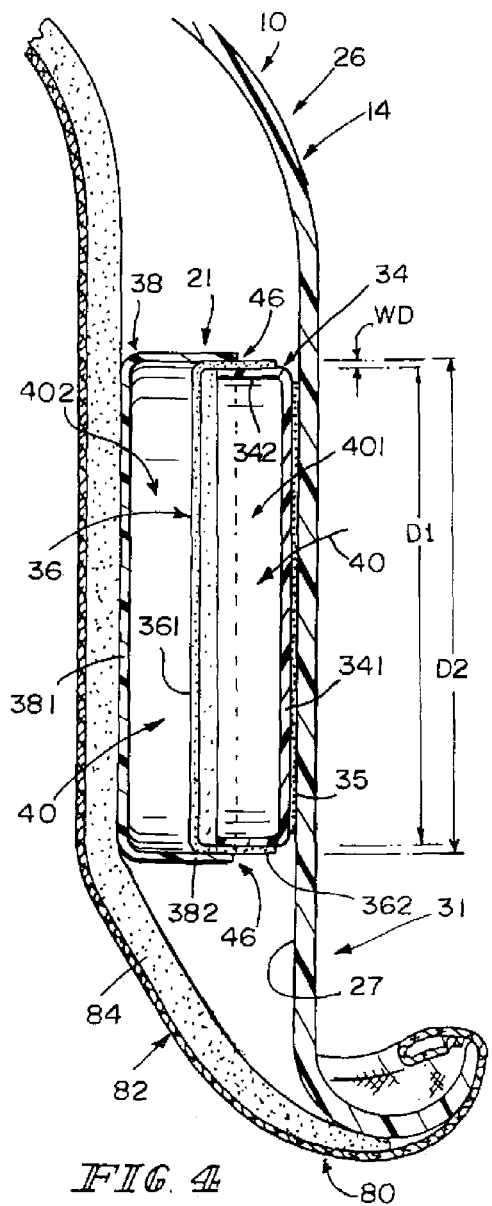
FIG. 4 is an enlarged sectional view taken along line 4-4 of FIG. 1 showing placement of the right-side ride-down pad on an inner wall of the first side-wing panel of the headrest.

As suggested in FIGS. 2 and 4, right-side ride-down pad 21 is configured to retain air 23 in an interior region formed therein. This air 23 is discharged as suggested in FIG. 5 when ride-down pad 21 to exposed to an external impact force 20 to absorb energy associated with external impact force 20.

As suggested in FIGS. 2-4, ride-down pad 21 includes an inner shell 34 coupled to first side-wing panel 31 of headrest 26, an outer shell 38 separated from inner shell 34, and a support frame 36 interposed between inner and outer shells 34, 38. Inner and outer shells 34, 38 cooperate to form an interior region 40 therebetween and to form an air-exhaust passageway 46 therebetween. In an illustrative embodiment, a portion of support frame 36 is positioned to lie in air-exhaust passageway 46 as suggested in FIGS. 2 and 4.

As suggested in FIGS. 2-4, outer shell 38 is mounted for movement relative to inner shell 34 to vary the volume of interior region 40. Interior region 40 provides an air chamber in ride-down pad 21. In a pre-collision position shown, for example, in FIGS. 2 and 4, outer shell 38 is positioned relative to inner shell 34 to provide interior region 40 with a maximum volume. During a collision in which first side-wing panel 27 of juvenile vehicle seat 10 is exposed to an external impact force 20, outer shell 38 moves relative to inner shell 34 and toward first side-wing panel 27 to reduce the volume of interior region 40 and cause air 23 extant in interior region 40 to flow out of the air chamber provided in ride-down pad 21 to the surroundings through air-exhaust passageway 46 as shown, for example, in FIG. 5.

Inner shell 34 is cup-shaped in an illustrative embodiment and includes a plate 341 and an endless rim 342 as suggested in FIGS. 2 and 3. Plate 341 is round and flat and endless rim 342 is annular and coupled to a perimeter edge of plate 341 in the illustrated embodiment. Rim 342 is characterized by an external diameter D1 as suggested in FIG. 4. A fastener 35 such as an adhesive or a hook-and-loop system is used to hold plate 341 (and thus inner shell 34) in a stationary position on inner wall 27 of first side-wing panel 31 as suggested in FIGS. 4 and 5.

Outer shell 38 is cup-shaped in an illustrative embodiment and includes a plate 381 and an endless rim 382 as suggested in FIGS. 2 and 3. Plate 381 is round and flat and endless rim 382 is annular an coupled to a perimeter edge of plate 381 in the illustrated embodiment. Rim 382 is characterized by an internal diameter D2 as suggested in FIG. 4. Internal diameter D2 of rim 382 is greater than external diameter D1 of rim 342 to allow outer shell 38 to mate in telescoping relation to inner shell 34 as suggested in FIGS. 4 and 5 wherein rim 342 of inner shell 34 is movable inside and relative to rim 382 of outer shell 38.

Support frame 36 is cup-shaped in an illustrative embodiment and includes a rim 362 as suggested in FIGS. 2 and 3. Rim 362 of support frame 36 is annular and arranged to mate with an exterior surface of rim 342 of inner shell 34. Any suitable means can be used to retain support-frame rim 362 in a stationary position on inner-shell rim 342 in the illustrated embodiment as shown, for example, in FIGS. 4 and 5.

Support frame 36 also includes in an illustrative embodiment, a plate 361 coupled to an outer edge of support-frame rim 362 as shown, for example, in FIGS. 2-5. Plate 361 is round and flat in an illustrative embodiment. Plate 361 is made of an air-permeable material as suggested in FIG. 5 to allow flow of air 23 extant in a first air chamber 401 provided between support-frame plate 361 and inner-shell plate 341 through plate 361 to reach air-exhaust passageway 46 defined between inner-shell rim 342 and outer-shell rim 382.

Support-frame rim 362 is arranged to extend through annular air-exhaust passageway 46 as suggested in FIGS. 2 and 4. Annular air-exhaust passageway 46 is characterized by a width dimension WD as suggested in FIG. 4. Air 23 can flow through support-frame rim 362 as it flows through air-exhaust passageway 46 as suggested in FIG. 5 owing to the permeability of the material used to make support-frame rim 362.

Outer-shell plate 381 and support-frame plate 361 cooperate to form a second air chamber 402 therebetween as suggested in FIGS. 2 and 4. Second air chamber 402 can vary in volume in response to movement of all or part of outer shell 38 relative to support frame 36 as suggested in FIGS. 4 and 5. As noted herein, support-frame plate and rim 361, 362 is made of an air-permeable material so as to allow flow of air 23 extant in second air chamber 402 through plate 361 and rim 362 to reach and flow the rough air-exhaust passageway 46 defined between inner-shell rim 342 and outer-shell rim 382.

During assembly, inner and outer shells 34, 38 and support frame 36 are joined together in the order suggested in FIG. 3 to produce ride-down pad 21 as suggested in FIGS. 2 and 4. Outer-shell rim 382 is configured to provide means for yieldably gripping support-frame rim 362 while a portion of support-frame rim 362 is trapped therebetween to cause outer shell 38 to remain normally in an initial position shown in FIGS. 2 and 4 relative to inner shell 34 and support frame 36 until ride-down pad 21 is exposed to a sufficient external impact force 20 to cause relative movement of inner and outer shells 34, 38 as suggested in FIG. 5. As noted herein, such relative movement decreases the volume of interior region 40 and causes air 23 in interior region 40 to flow through air-exhaust passageway 46 and a permeable portion of support-frame rim 362 located in air-exhaust passageway 46 to the surroundings outside of ride-down pad 21.

It is also within the scope of this disclosure to manufacture inner and outer shells 34, 38 and support frame 36 using deformable materials that will yield as suggested in FIG. 5 under loads such as a sufficient external impact force 20. Such deformation can lead to a decrease in the volume of interior region 40, which decrease causes air 23 to be discharged to the surroundings as suggested in FIG. 5. During a collision, the volume of interior region 40 decreased (in contrast to the pre-collision volume of interior region 40 shown in FIG. 4) due to shell deformation and relative shell movement to cause air 23 to be discharged from interior region 40 to the surroundings through air-exhaust passageway 46.

In an illustrative embodiment, an outer cover 80 is coupled to headrest 26 and arranged to cover each of right-side and left-side ride-down pads 21, 22. Outer cover 80 functions to dissipate energy associated with external impact forces 20 and to protect ride-down pads 21, 22 from damage. In an illustrative embodiment, outer cover 80 includes an outer skin 82 and a cushion 84 under outer skin 82 as shown, for example, in FIGS. 3-5. Outer cover 80 is arranged to cover outer shell 38 and locate ride-down pad 21 in a space formed between outer cover 38 and first side-wing panel 31 as suggested in FIG. 4. Outer cover 80 mates with an exterior surface of outer shell 38 while an opposite interior surface of outer shell 38 mates with support frame 36 as also shown in FIG. 4.

Child restraint 11 comprises a juvenile vehicle seat 10 and an energy-dissipation 16 system coupled to juvenile vehicle seat 10 as suggested in FIGS. 1-5. Energy-dissipation system 16 comprises a ride-down pad 21 including an inner shell 34 coupled to juvenile vehicle seat 10 and an outer shell 38 arranged for movement relative to inner shell 34 and to cooperate with inner shell 34 to define an interior region 40 therebetween sized to vary in volume in response to movement of outer shell 38 toward inner shell 34 as suggested in FIGS. 4 and 5. Ride-down pad 21 also includes a support frame 36 interposed between and mated with inner and outer shells 34, 38 and made of an air-permeable material as suggested in FIGS. 2, 4, and 5. Inner and outer shells 34, 38 cooperate to define means for causing air 23 extant in an air chamber 401, 402 included in interior region 40 to pass through a portion 361, 362 of support frame 36 as air 23 is discharged from interior region 40 to the surrounding region during movement of outer shell 38 toward inner shell 34 in response to an external impact force 20 so that ride-down pad 21 absorbs external energy associated with external impact force 20 to minimize g-loads experienced by a child seated on juvenile vehicle seat 10 as suggested in FIG. 5.

Inner and outer shells 34, 38 are arranged to lie in spaced-apart relation to one another as suggested in FIGS. 2, 4, and 5 to form therebetween an air-exhaust passageway 46 opening into interior region 40. A portion 362 of support frame 36 lies in air-exhaust passageway 46 as suggested in FIG. 4. Inner shell 34 includes an endless rim 342. Outer shell 38 includes an endless rim 382 arranged to lie in spaced-apart relation to endless rim 342 of inner shell 34 to define air-exhaust passageway 46 therebetween as suggested in FIG. 4.

Portion 362 of support frame 36 is an endless rim arranged to lie in air-exhaust passageway 46 and surround and mate with endless rim 342 of inner shell 34 as suggested in FIGS. 2-4. Endless rim 382 of outer shell 38 is arranged to surround and mate with endless rim 362 of support frame 36 as suggested in FIGS. 2-4.

Inner shell 34 further includes a plate 341 coupled to first side-wing panel 31 and to endless rim 342 of inner shell 34 as suggested in FIG. 3. Outer shell 38 further includes a plate 381 coupled to endless rim 382 of outer shell 38 and arranged to lie in spaced-apart relation to plate 341 of inner shell 34 to define interior region 40 therebetween as suggested in FIG. 4.

Support frame 36 further includes a plate 361 coupled to endless rim 362 of support frame 36 and arranged to lie in interior region 40 in spaced-apart relation to each of plates 341, 381 of inner and outer shells 34, 38 as suggested in FIG. 4. Plates 341 of inner shell 34 and support frame 36 cooperate to define a first air chamber 401 therebetween as shown in FIG. 4. Plates 361, 381 of support frame 36 and outer shell 38 cooperate to define a second air chamber 402 therebetween as shown in FIG. 4. Air 23 in interior region 40 is free to pass through air-permeable portions of plate 361 and endless rim 362 of support frame 36 to flow between first and second air chambers 401, 402 and air-exhaust passageway 46 during movement of outer shell 38 toward inner shell 34 as suggested in FIG. 5.

Air-exhaust passageway 46 is ring-shaped and portion 362 of support frame 36 is ring-shaped and sized to fill air-exhaust passageway 46 as suggested in FIGS. 2 and 4. Outer shell 38 is clamped to inner shell 34 to trap portion 362 of support frame 36 therebetween in an initial position of outer shell 38 relative to inner shell 34 as suggested in FIGS. 2 and 4 to establish a predetermined initial volume of interior region 40 and yet to slip relative to portion 362 of support frame 36 during movement of outer shell 38 toward inner shell 34 to compress air 23 extant in interior region 40 to cause such air 23 to flow out of interior region 40 to the surroundings through air-exhaust passageway 46 as suggested in FIG. 5.

Support frame 36 further includes a plate 361 coupled to the portion 362 of support frame 36 that is ring-shaped. Plate 361 of support frame 36 is arranged to lie in and partition interior region 40 to form a first air chamber 401 between inner shell 34 and plate 361 of support frame 36 and to form a second air chamber 402 between outer shell 38 and plate 381 of support frame 36 as suggested in FIG. 4. Air 23 in interior region 40 is free to pass through air-permeable portions of plate 361 of support frame 361 and portion 362 of support frame 36 that is ring-shaped to flow between first and second air chambers 401, 402 and air-exhaust passageway 46 during movement of outer shell 38 toward inner shell 34 as suggested in FIG. 5.

In a second embodiment of the present disclosure, a child restraint 111 includes right-side and left-side ride-down pads 121, 122 mounted on juvenile vehicle seat 10 as shown in FIG. 6. As suggested in FIGS. 9 and 10, right-side ride-down pad 121 is configured to absorb energy associated with external impact force 20 during a collision involving child restraint 111.

Figure 8:
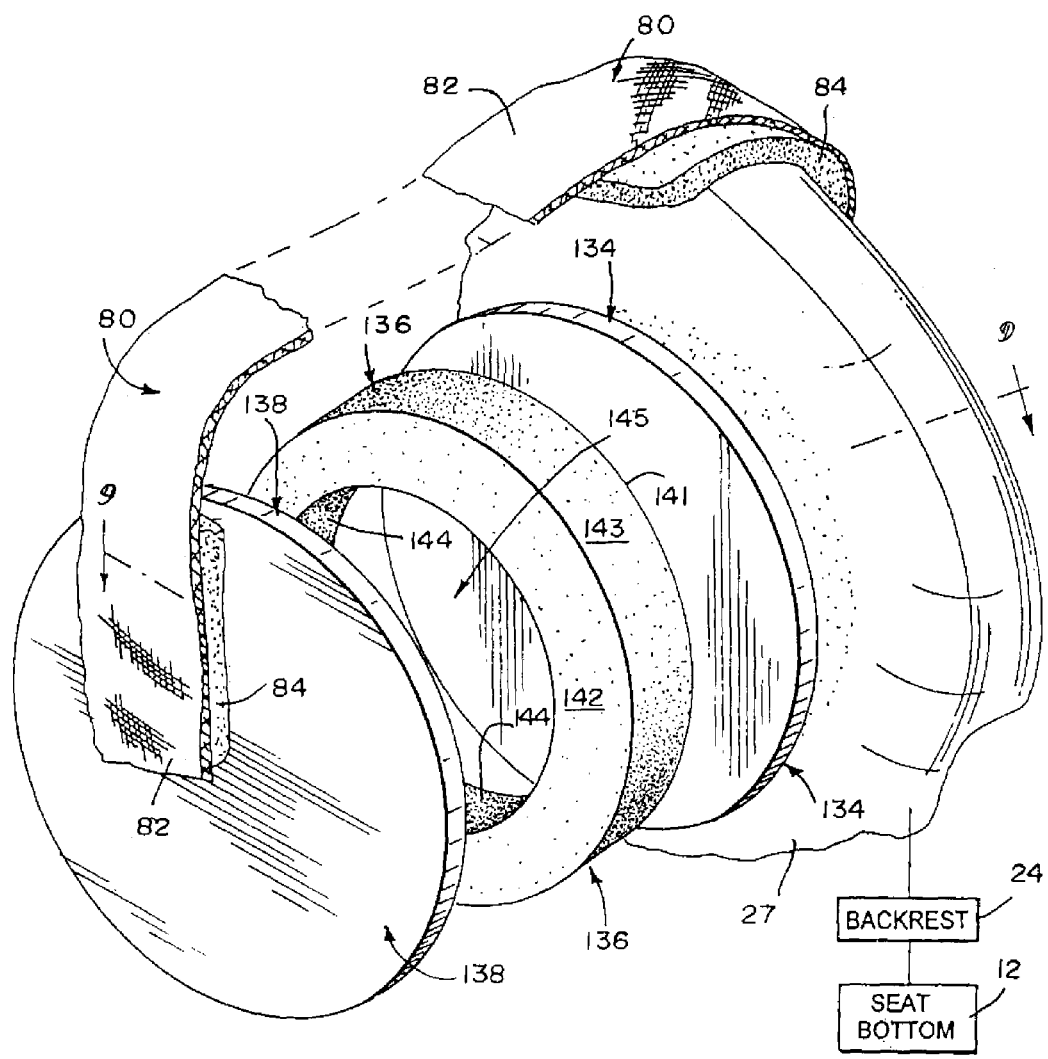
FIG. 8 is an exploded perspective assembly view of the right-side ride-down pad of FIGS. 6 and 7.

As suggested in FIGS. 7-9, ride-down pad 121 includes an inner shell 134 coupled to first side-wing panel 31 of headrest 26, an outer shell 138 separated from inner shell 134, and a support frame 136 interposed between inner and outer shells 134, 138. Inner and outer shells 134, 138 cooperate to form an interior region 140 therebetween and to form an air-exhaust passageway 146 therebetween.

Inner shell 134 is plate-shaped in an illustrative embodiment shown in FIGS. 7-10. Inner shell 134 is round and flat in the illustrated embodiment. A fastener 135 such as an adhesive or a hook-and-loop system is used to hold inner shell 134 in a stationary position on inner wall 27 of first side-wing panel 31 as suggested in FIGS. 9 and 10.

Outer shell 138 is plate-shaped in an illustrative embodiment shown in FIGS. 7-10. Outer shell 138 is round and flat in the illustrated embodiment. Inner and outer shell 134, 138 each has the same diameter D as suggested in FIG. 9.

Support frame 136 is ring-shaped in an illustrative embodiment as suggested in FIGS. 8 and 9. Support frame 136 includes an annular inner face 141 mating with inner shell 134, an annular outer face 142 mating with outer shell 138, a cylindrical exterior side wall 143 having diameter D and extending between inner and outer shells 134, 138, and a cylindrical interior side wall 144 having a diameter d and forming an interior cavity 145 surrounded by ring-shaped support frame 136 and arranged to lie between inner and outer shells 134, 138 as suggested in FIGS. 8 and 9.

Support frame 136 includes an inner face 141 mating with inner shell 134, an outer face 142 mating with outer shell 138, and an exterior side wall 143 extending between inner and outer faces 141, 142 and inner and outer shells 134, 138 as suggested in FIGS. 7 and 8. Support frame 136 further includes an endless interior wall 144 forming an interior cavity 145 between inner and outer shells 134, 136 as suggested. Inner face 141 has an annular shape, outer face 142 has an annular shape, and exterior side wall 143 has an annular shape as suggested in FIG. 8.

Support frame 136 is made of a deformable and air-permeable material. Support frame 136 is configured to provide means for supporting inner and outer shells 134, 136 in an initial position separated from one another to establish an initial volume of interior region 140 until relative movement of inner and outer shells 134, 138 happens when ride-down pad 121 is exposed to an external impact force 20 so that deformable support frame 136 deforms at a rate that allows ride-down pad 121 to absorb external energy associated with external impact force 20.

As suggested in FIG. 10, during an illustrative collision, external impact force 20 strikes first side-wing panel 31 of headrest 26 to deform support frame 136 in right-side ride-down pad 121. During such deformation, some of the air 23 extant in interior region 140 is discharged to the surroundings through air-exhaust passageway 146. Some of the energy associated with external impact force 20 has been dissipated owing, in part to deformation of deformable support frame 136 and discharge of air 23 from interior region 140 as suggested in FIG. 10. This minimizes a resulting force 200 applied to child 100 seated in juvenile seat 10 of child restraint 111. This energy absorption feature minimizes the g-loads (acceleration) experienced by child 100 and also maximizes the ride-down time between the first strike of an impacting object on first side-wing panel 31 of headrest 26 of juvenile vehicle seat 10 and the moment the resulting force reaches zero.

The invention claimed is:

1. A child restraint comprising
a juvenile vehicle seat and
an energy-dissipation system coupled to the juvenile vehicle seat, the energy-dissipation system comprising a ride-down pad including an inner shell coupled to the juvenile vehicle seat, an outer shell arranged for movement in a telescopic manner relative to the inner shell and to cooperate with the inner shell to define an interior region therebetween sized to vary in volume in response to movement of the outer shell toward the inner shell, and a support frame interposed between and mated with the inner and outer shells and made of an air-permeable material, wherein the inner and outer shells cooperate to define means for causing air extant in an air chamber included in the interior region to pass through a portion of the support frame as the air is discharged from the interior region to the surrounding region during movement of the outer shell toward the inner shell in response to an external impact force so that the ride-down pad absorbs external energy associated with the external impact force to minimize g-loads experienced by a child seated on the juvenile vehicle seat.

2. The child restraint of claim 1, wherein the juvenile vehicle seat includes a seat back including a backrest and a headrest coupled to the backrest, the headrest includes a first side-wing panel, the inner shell is coupled to the first side-wing panel, the juvenile vehicle seat further includes an outer cover coupled to the headrest and arranged to cover the outer shell and locate the ride-down pad in a space formed between the outer cover and the first side-wing panel.

3. The child restraint of claim 2, wherein the outer cover mates with an exterior surface of the outer shell while an opposite interior surface of the inner shell mates with the support frame.

4. The child restraint of claim 1, wherein the inner and outer shells are arranged to lie in spaced-apart relation to one another to form therebetween an air-exhaust passageway opening into the interior region and a portion of the support frame lies in the air-exhaust passageway.

5. The child restraint of claim 4, wherein the inner shell includes an endless rim and the outer shell includes an endless rim arranged to lie in spaced-apart relation to the endless rim of the inner shell to define the air-exhaust passageway therebetween.

6. The child restraint of claim 5, wherein the portion of the support frame is an endless rim arranged to lie in the air-exhaust passageway and surround and mate with the endless rim of the inner shell and the endless rim of the outer shell is arranged to surround and mate with the endless rim of the support frame.

7. The child restraint of claim 6, wherein the inner shell further includes a plate coupled to the first side-wing panel and to the endless rim of the inner shell and the outer shell further includes a plate coupled to the endless rim of the outer shell and arranged to lie in spaced-apart relation to the plate of the inner shell to define the interior region therebetween.

8. The child restraint of claim 7, wherein the support frame further includes a plate coupled to the endless rim of the support frame and arranged to lie in the interior region in spaced-apart relation to each of the plates of the inner and outer shells, the plates of the inner shell and the support frame cooperate to define a first air chamber therebetween, the plates of the support frame and the outer shell cooperate to define a second air chamber therebetween, and air in the interior region is free to pass through air-permeable portions of the plate and endless rim of the support frame to flow between the first and second air chambers and the air-exhaust passageway during movement of the outer shell toward the inner shell.

9. The child restraint of claim 4, wherein the air-exhaust passageway is ring-shaped and the portion of the support frame is ring-shaped and sized to fill the air-exhaust passageway.

10. The child restraint of claim 9, wherein the outer shell is clamped to the inner shell to trap the portion of the support frame therebetween in an initial position of the outer shell relative to the inner shell to establish a predetermined initial volume of the interior region and yet to slip relative to the portion of the support frame during movement of the outer shell toward the inner shell to compress air extant in the interior region to cause such air to flow out of the interior region to the surroundings through the air-exhaust passageway.

11. The child restraint of claim 10, wherein the support frame further includes a plate coupled to the portion of the support frame that is ring-shaped, the plate of the support frame is arranged to lie in and partition the interior region to form a first air chamber between the inner shell and the plate of the support frame and a second air chamber between the outer shell and the plate of the support frame, and air in the interior region is free to pass through air-permeable portions of the plate of the support frame and the portion of the support frame that is ring-shaped to flow between the first and second air chambers and the air-exhaust passageway during movement of the outer shell toward the inner shell.

12. The child restraint of claim 4, wherein the air-exhaust passageway is ring-shaped and the portion of the support frame is ring-shaped and sized to fill the air-exhaust passageway.

13. The child restraint of claim 12, wherein the inner shell includes an endless rim, the portion of the support frame is arranged to surround the endless rim of the inner shell, the outer shell includes an endless rim arranged to surround the portion of the support frame, and the portion of the support frame is trapped in the air-exhaust passageway defined between the endless rims of the inner and outer shells.

14. The child restraint of claim 1, wherein the support frame includes an inner face mating with the inner shell, an outer face mating with the outer shell, and an exterior side wall extending between the inner and outer faces and the inner and outer shells.

15. The child restraint of claim 14, wherein the support frame further includes an endless interior wall forming an interior cavity between the inner and outer shells.

16. The child restraint of claim 14, wherein the inner face has an annular shape, the outer face has an annular shape, and the exterior side wall has an annular shape.

17. A child restraint comprising
a juvenile vehicle seat comprising a seat back including a headrest having a first side-wing panel, and
an energy-dissipation system comprising a cup-shaped inner shell coupled to the first side-wing panel and arranged to open away from the first side-wing panel, a cup-shaped outer shell separated from the cup-shaped inner shell to form an air-exhaust passageway opening into an interior region formed between the cup-shaped inner and outer shells and arranged to open toward the first side-wing panel and align in telescoping relation with the cup-shaped inner shell to free the cup-shaped outer shell for limited relative movement toward the cup-shaped inner shell to decrease an air-capacity volume of the interior region, and a support frame including an endless rim made of an air-permeable material and arranged to lie in the air-exhaust passageway to conduct air discharged from the interior region there through in response to telescoping movement of the cup-shaped outer shell toward the cup-shaped inner shell to decrease an air-capacity volume of the interior region during exposure of the energy-dissipation system and the first side-wing panel to an external impact force.

18. The child restraint of claim 17, wherein the support frame further includes a plate made of the air-permeable material and arranged to lie in the interior region and partition the interior region to form a first air chamber between the plate and the inner shell and a second air chamber between the plate and the outer shell and air in the first and second air chambers is free to pass through air-permeable portions of the plate and endless rim of the support frame to flow between the first and second air chambers and the air-exhaust passageway during movement of the outer shell toward the inner shell.

19. The child restraint of claim 17, wherein the air-exhaust passageway is ring-shaped and the endless rim of the support frame is ring-shaped and sized to fill the air-exhaust passageway.

20. The child restraint of claim 17, wherein the outer shell is clamped to the inner shell to trap the endless rim of the support frame therebetween in an initial position of the outer shell relative to the inner shell to establish a predetermined initial volume of the interior region and yet to slip relative to the portion of the support frame during movement of the outer shell toward the inner shell to compress air extant in the interior region to cause such air to flow out of the interior region to the surroundings through the air-exhaust passageway.

21. A child restraint comprising
a juvenile vehicle seat comprising a seat back including a headrest having a first side-wing panel, and
an energy-dissipation system comprising a plate-shaped inner shell coupled to the first side-wing panel, a plate-shaped outer shell separated from the plate-shaped inner shell, and a ring-shaped support frame interposed between and mated with the plate-shaped inner and outer shells and made of an air-permeable material, wherein the plate-shaped inner and outer shells cooperate to define means discharging air extant in an interior region formed in the ring-shaped support frame and between the plate-shaped inner and outer shells to surroundings outside the ring-shaped support frame during movement of the plate-shaped outer shell toward plate-shaped inner shell in response to exposure of the energy-dissipation system and the first side-wing panel to an external impact force so that a ride-down pad comprising the plate-shaped inner and outer shells and the ring-shaped support frame absorbs external energy associated with the external impact force to minimize g-loads experienced by a child seated on the juvenile vehicle seat.

22. A child restraint comprising
a juvenile vehicle seat
an energy-dissipation system coupled to the juvenile vehicle seat, the energy-dissipation system comprising a ride-down pad including an inner shell coupled to the juvenile vehicle seat, an outer shell arranged for movement in a telescopic manner relative to the inner shell and to cooperate with the inner shell to define an interior region therebetween sized to vary in volume in response to movement of the outer shell toward the inner shell, and a support frame interposed between and mated with the inner and outer shells and made of an air-permeable material, wherein the inner and outer shells cooperate to define means for causing air extant in an air chamber included in the interior region to pass through a portion of the support frame as the air is discharged from the interior region to the surrounding region during movement of the outer shell toward the inner shell in response to an external impact force so that the ride-down pad absorbs external energy associated with the external impact force to minimize g-loads experienced by a child seated on the juvenile vehicle seat and
wherein the inner and outer shells are arranged to lie in spaced-apart relation to one another to form therebetween an air-exhaust passageway opening into the interior region and a portion of the support frame lies in the air-exhaust passageway.

23. A child restraint comprising
a juvenile vehicle seat
an energy-dissipation system coupled to the juvenile vehicle seat, the energy-dissipation system comprising a ride-down pad including an inner shell coupled to the juvenile vehicle seat, an outer shell arranged for movement in a telescopic manner relative to the inner shell and to cooperate with the inner shell to define an interior region therebetween sized to vary in volume in response to movement of the outer shell toward the inner shell, and a support frame interposed between and mated with the inner and outer shells and made of an air-permeable material, wherein the inner and outer shells cooperate to define means for causing air extant in an air chamber included in the interior region to pass through a portion of the support frame as the air is discharged from the interior region to the surrounding region during movement of the outer shell toward the inner shell in response to an external impact force so that the ride-down pad absorbs external energy associated with the external impact force to minimize g-loads experienced by a child seated on the juvenile vehicle seat and
wherein the support frame includes an inner face mating with the inner shell, an outer face mating with the outer shell, and an exterior side wall extending between the inner and outer faces and the inner and outer shells wherein a portion of the exterior wall extends beyond an overlapped area of the inner and outer shells and is not enclosed by the shells.

* * * * *